Dec. 13, 1932.  L. G. RANDALL  1,890,695
FASTENING DEVICE FOR AUTOMOBILE HOODS
Filed Sept. 11, 1930  3 Sheets-Sheet 1
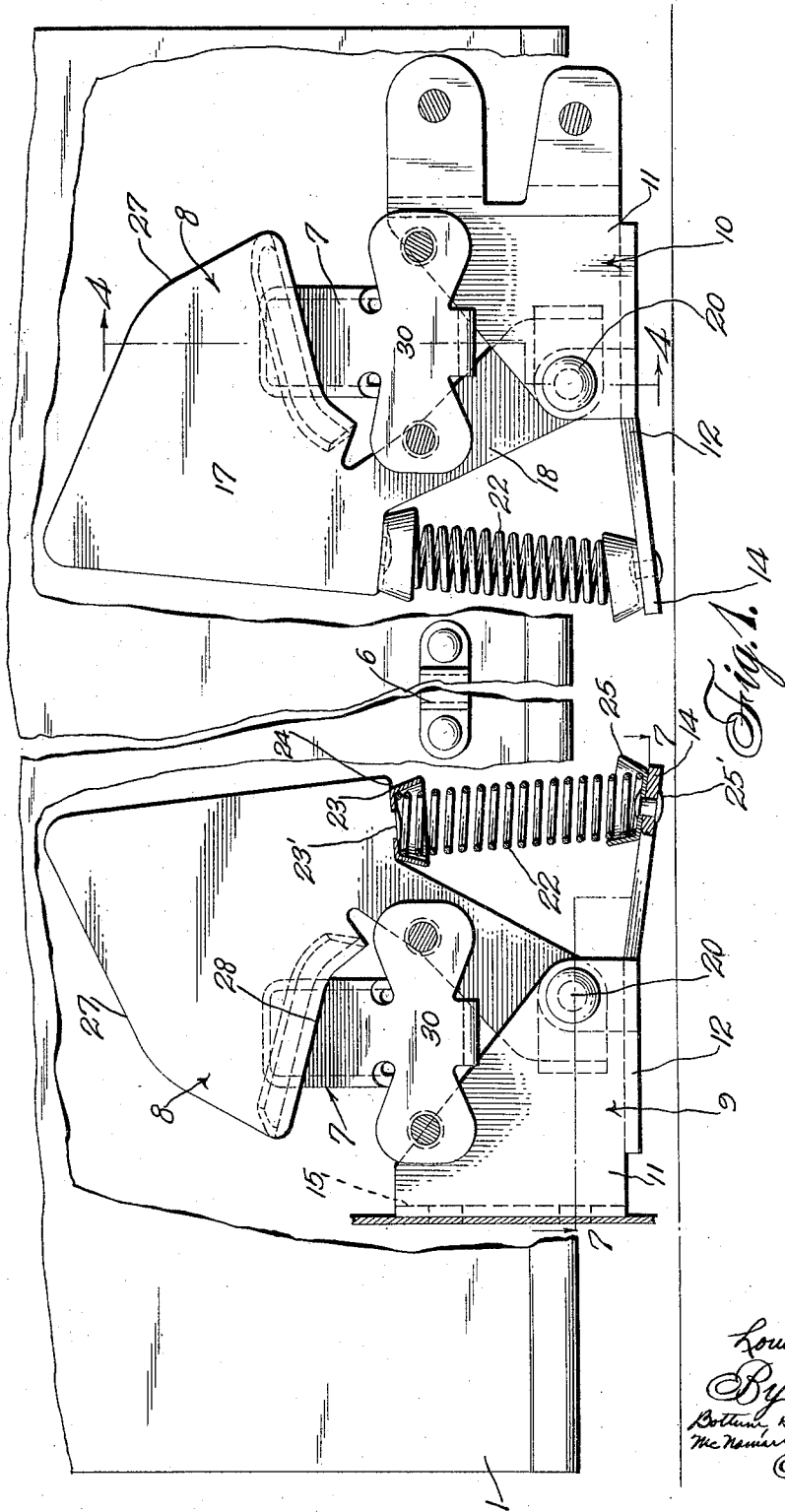
Inventor
Louis G. Randall,
By
Attorneys Dec. 13, 1932.  L. G. RANDALL  1,890,695
FASTENING DEVICE FOR AUTOMOBILE HOODS
Filed Sept. 11, 1930   3 Sheets-Sheet 2
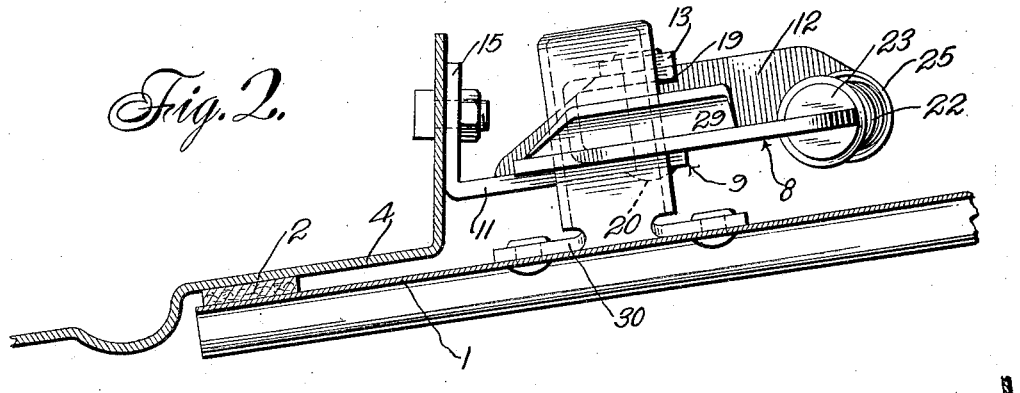
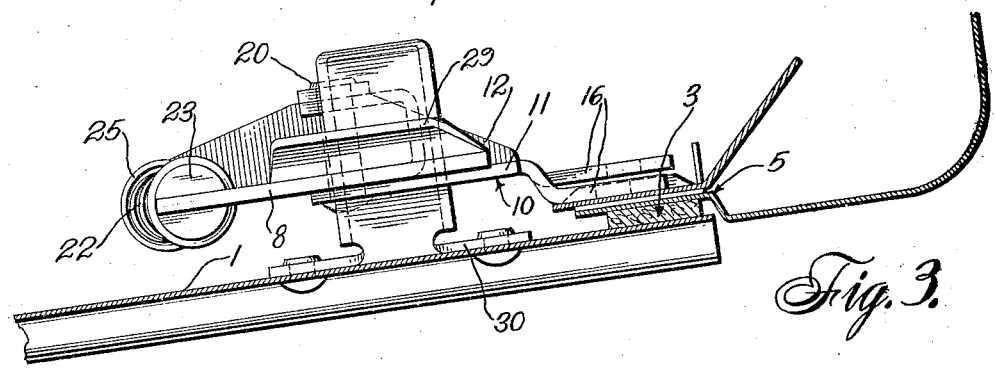
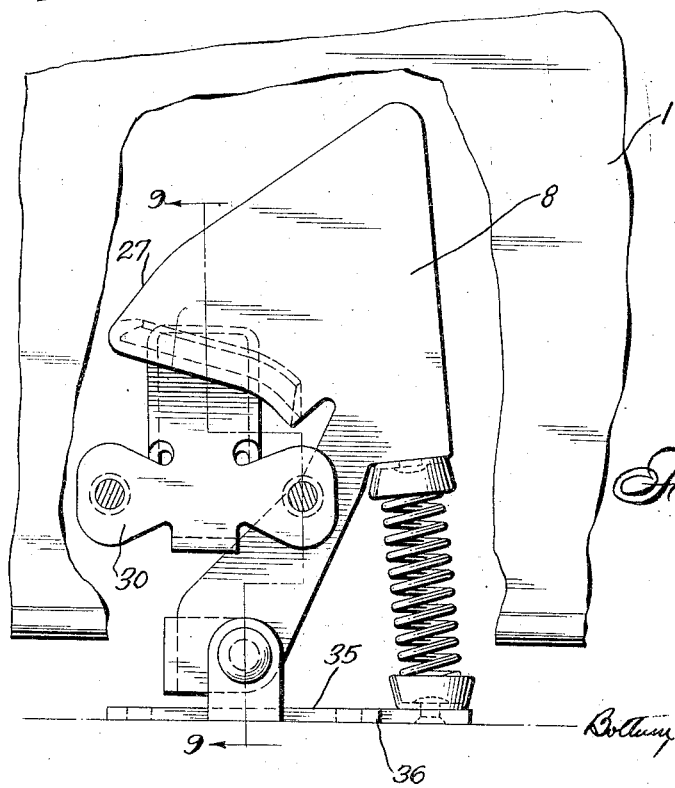

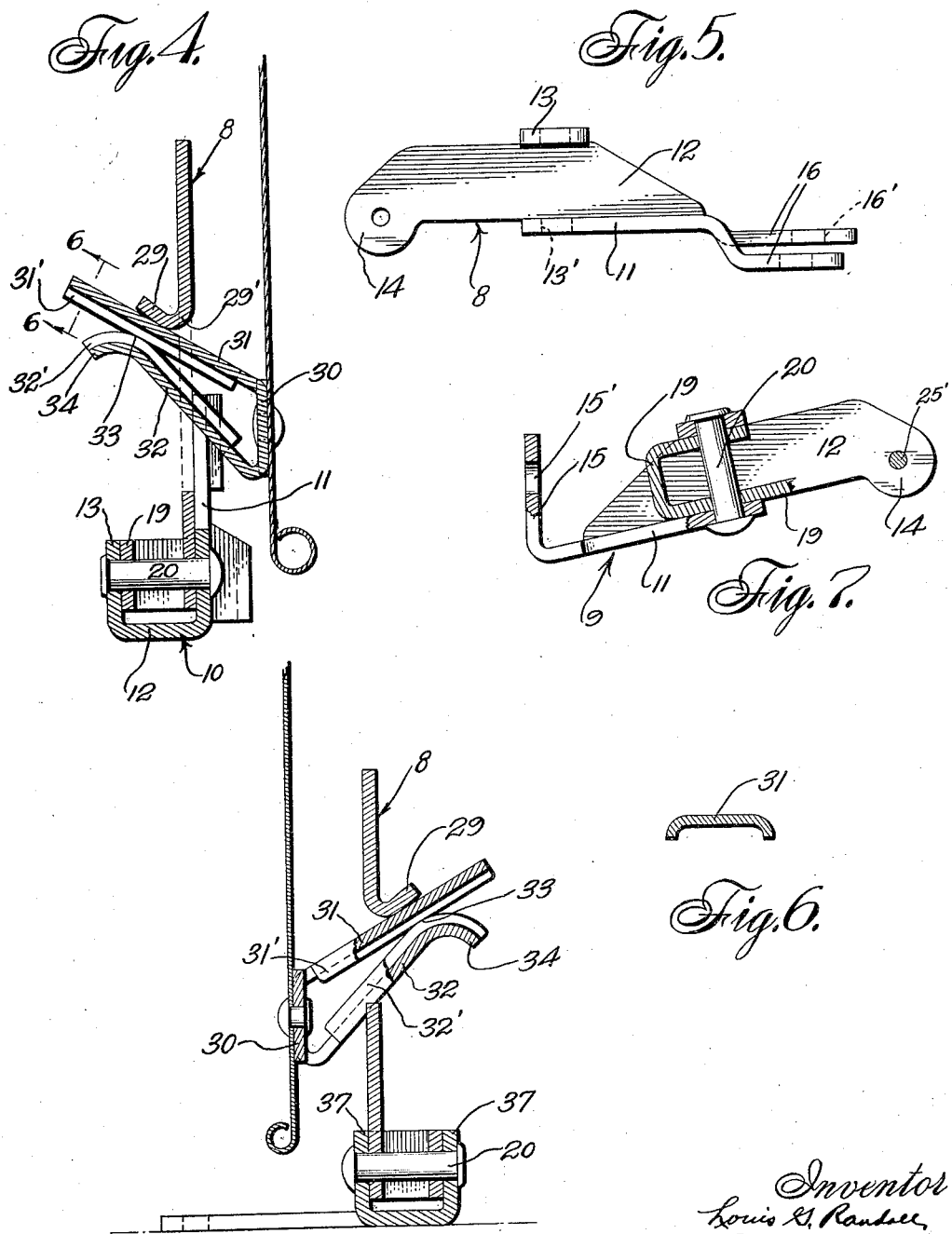

Patented Dec. 13, 1932

1,890,695

UNITED STATES PATENT OFFICE

LOUIS G. RANDALL, OF MILWAUKEE, WISCONSIN, ASSIGNOR TO E. R. WAGNER MFG. CO., OF NORTH MILWAUKEE, WISCONSIN, A CORPORATION OF WISCONSIN

FASTENING DEVICE FOR AUTOMOBILE HOODS

Application filed September 11, 1930. Serial No. 481,093.

This invention relates to automatic fastening or clamping means especially designed for use with the hoods of automobiles or other motor vehicle.

Among the principal objects of the present invention are to provide an automobile hood clamp of this character which eliminates the necessity of manipulating latches and requires but the simple grasping of the hood handle to raise and release or lower and lock the hood in position; which has its latching means concealed and protected thereby reducing to a minimum projections or obstructions interfering with the washing or polishing of the car and detracting from the lines or appearance of the car; which functions in its latched position to firmly hold the hood down, to pull it inwardly into snug engagement with its ledges on the radiator and the cowl, and to centralize the hood longitudinally or fore and aft of the automobile; and which is, in general, of simple and durable construction, reliable, effective and easy in operation, comparatively inexpensive to manufacture, and adapted to be conveniently and readily installed.

Another important object of the invention is to provide an automobile hood clamp of this character and having these advantages and which has the elements of the clamping mechanism connected with the automobile proper mounted on the radiator frame and cowl thereby tending to reduce vibration.

Another object of the invention is to provide an automobile hood clamp of this character embodying means to take care of vertical as well as transverse inaccuracies or variations in the construction for which the clamp is designed.

Still another object of the invention resides in the provision of cooperating clamping or latching members of such construction as to stand up under the usage to which they are subjected under actual conditions.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a fragmentary view in side elevation showing portions of the hood section with the clamp or latching means embodying the present invention associated therewith;

Figure 2 is a view partly in top plan and partly in horizontal section showing the clamping means at the left hand side of Figure 1;

Figure 3 is a view similar to Figure 2 but showing the clamping means at the right hand side of Figure 1;

Figure 4 is a view in vertical section taken on line 4—4 of Figure 1;

Figure 5 is a detail view in top plan of the mounting bracket employed with the latch shown in Figure 4;

Figure 6 is a detail sectional view taken on line 6—6 of Figure 4;

Figure 7 is a fragmentary detail view taken in section on line 7—7 of Figure 1, parts being omitted for the sake of simplicity in illustration;

Figure 8 is a fragmentary view partly in side elevation and partly in section showing a slight modification of the latching mechanism, the modification consisting in the adaptation of the mounting bracket for connection to the automobile frame; and Figure 9 is a fragmentary view in section taken on line 9—9 of Figure 8.

Referring to the drawings, and more particularly to Figures 1 to 3, the numeral 1 designates the conventional side hinged section of an automobile hood which is adapted in its closed or lowered position to snugly engage against the cushion or packing strips 2 and 3 provided therefor on the ledges 4 and 5 the ledges 4 and 5 being formed on the cowl and radiator casing or frame, respectively, of the automobile. It is to be understood that while only one side of the hood is shown, the invention is duplicated on the other side. Centrally of each side section 1 of the hood a conventional bail-like handle 6 is provided, the handle being riveted to its hood section and being designed to permit of manual raising and lowering of the hood.

The present invention is concerned with the provision of a hold-down clamp or fastening means for releasably securing each side section of the hood in closed position. In carrying out this purpose each side section of the hood is provided with two spaced inwardly and upwardly extending latching or keeper projections designated at 7. These latching projections 7 are arranged to co-operate with similar but oppositely disposed hooks designated generally at 8 and constructed, mounted and operating as will be hereinafter described.

A mounting bracket is provided for each hook 8, the mounting bracket for one hook being designated generally at 9, and the mounting bracket for the other hook being designated generally at 10. The mounting brackets 9 and 10 are, in most respects, of identical construction and each includes a side plate 11 having a horizontally disposed base plate 12 formed integral therewith. Each of the base plates 12 opposite the side plate 11 is provided with an upstanding apertured ear 13 and the side plate 11 has an opening 13' alined with the aperture of the ear 13. One end of each base 12 of the bracket is provided with a lateral extension 14 designed to be attached to a spring cup, as will hereinafter more clearly appear. The side plate 11 of each bracket is provided with the attaching portions or wings by which the bracket is secured in position. The bracket 9, shown at the left hand side of Figure 1, and illustrated in detail in Figure 7, is formed with a right angle attaching flange or wing 15 designed to snugly engage the cowl of the automobile and to be fixed thereto by rivets or other fasteners passing through openings 15 thereof and as illustrated in Figure 2. The other bracket 10, shown at the right hand side of Figure 1 and in detail in Figure 5, has one end of its side plate formed with spaced attaching ears or wings designated at 16 and apertured as at 16' to receive fastening devices coacting therewith and with the radiator frame or casing, as suggested in Figure 3.

Both brackets 9 and 10 are constructed of a single piece of sheet metal which is formed up to the shape and structure shown.

The hooks 8, which are of identical construction, are also formed with a single piece of sheet metal and each hook comprises in general a bill designated generally at 17 and an integral shank designated generally at 18. The lower end of the shank 18 of each hook is provided with an angular extension 19 which gives a U-shaped formation to the lower end of the shank. Opposed portions of this U-shaped formation are provided with bearing openings alined with the opening 13' of the side plate of the mounting bracket of the hook and with the aperture of the ear or lug 13 thereof. A pivot pin 20 is fitted through these alined openings whereby each hook is pivotally supported on its mounting bracket (compare Figures 1, 4 and 7). The U-shaped formation 19 also provides the stop or abutment which is cooperable with the base portion 12 of this mounting bracket to limit the swinging movement of the hook on which it is formed in one direction. Each hook is biased or influenced to swing to latching position by means of an expansible coil spring 22, one end of which engages in a spring cup 23 riveted as at 23' to a shoulder 24 on its hook and the other end of which engages in a spring cup 25 riveted as at 25' to the extension 14 of the base of its mounting bracket. The spring cups are offset to minimize buckling of the springs and to tend to retain them engaged with their cups. The bill 17 of each hook is formed with a double beveled nose 27 and just below the nose is cut out to form the hooking shoulder or effective portion 28 of the hook. The double beveled upper edge of the nose of each hook compensates for the movement of the hooks when the hood is being closed and the hooks are swung under the influence of the descending projection 7. The proper snap action is thus insured. This hooking shoulder is reinforced and has its action enhanced and eased by virtue of the formation of an integral, inturned and upwardly inclined lip 29, the juncture of the lip and bill proper being rounded as at 29'.

The hook locking shoulder 28 inclines upwardly toward the nose of the hook and the lip 29 is correspondingly formed for a purpose which will hereinafter more clearly appear.

Each of the cooperable latching or keeper projections is formed of a single piece of sheet metal bent or folded to provide an attaching portion 30 riveted to the hood section and converging upper and lower arms 31 and 32. Along the edges of the confronting faces of the arms 31 and 32 reinforcing flanges 31' and 32' are bent up, these flanges having portions engaging as indicated at 33 in Figure 4. The outer end of the lower arm 32 is preferably curved downwardly as indicated at 34 to prevent the hinged hood section swinging outwardly and the projections 7 slipping off the hooks 8 when the hood is being closed. As clearly shown in the drawings, the keeper projections 7 extend inwardly and upwardly at an angle so that when engaged by the inclined locking shoulders 28 they will be forced downwardly and inwardly thereby firmly holding the hood section in closed position against vertical displacement and snugly fitted against its packing strips 2 and 3. In addition, the cooperation of the projections with the oppositely inclined hooked locking shoulders 28 of the hooks 8 results in a longitudinal centering or proper fore and aft positioning of the hood section. The locking shoulders 28 of each hook inclines gradually adjacent the nose of the hook but adjacent the shank the inclination is sharper or steep. This takes care of variations in manufacturing limits while providing for minimum forward and maximum backward movement of the hooks.

It will be obvious from the foregoing that the hood section may be released and raised simply by pulling up on the handle 6. Such an upward pull results in an upward movement of the hood section and consequently of the inward latching or keeper projections 7. Upward movement of the keeper projections 7 swings the hooks 8 about their pivots 20 and against the influence of the springs 22 until the projections clear the ends of the hook locking shoulders 28. This action is facilitated by having the engaging surfaces of the hooks and projections offset horizontally from the pivots of the hooks. The beveled formation of the upper edges of the hooks 8 then tends to augment rather than resist further raising of the hood. Further, the hood may be closed by simply pressing down on the handle 6 thereby causing the lower arms 32 of the projections 7 to ride down the beveled edges 27 of the hooks 8 until the projections snap beneath the locking shoulders 28. During this action it will be obvious that the coaction of the projections 7 and inclined edges 27 result in a swinging or displacement of the hooks until the projections come into alinement with the locking shoulder.

The mounting of the brackets 9 and 10 in the manner above described, that is, on the radiator casing and cowl, tends to minimize vibration. However, these brackets may be directly secured to the frame by varying the formation of their attaching wings or attaching portions. Thus, as shown in Figures 8 and 9, each mounting bracket may consist simply of a base portion 35 having an attaching wing 36 located in the same plane as the base and apertured to permit of direct fastening to the frame. With this construction the side plate of the bracket is omitted entirely and a pair of apertured upstanding lugs 37 are formed integral with the base and provided with bearing openings to receive the pivot pin 20. In other respects, the form of the invention shown in Figures 8 and 9 may be identical with that shown in Figures 1 to 7 and hereinabove described.

The invention claimed is:

1. A fastening device for the hood of an automobile including a pair of oppositely disposed latching hooks supported for swinging movement longitudinally of the hood and provided with oppositely inclined latching shoulders, spring means biasing the hooks to latching position and co-operable latching projections adapted to be secured to the inner side of the hood and extending inwardly and upwardly therefrom.

2. A fastening device for the hood of an automobile including spaced oppositely disposed latching hooks supported for movement longitudinally of the hood and biased to latching position, and co-operable projections adapted to be secured to the hood and extending inwardly therefrom, at least one of the inter-engaged surfaces of each co-operable hook and projections being longitudinally inclined whereby to centralize the hood fore and aft of the automobile when the hood is closed.

3. A fastening device for the hood of an automobile including a latching hook supported for swinging movement longitudinally of the hood and having a beveled upper edge and a locking shoulder underlying the upper beveled edge, and a co-operable latching projection adapted to be secured to the hood and extending inwardly and upwardly therefrom, and engageable with the beveled edge and with the locking shoulder of the hook.

4. A fastening device for use with the hood of an automobile equipped with a handle and including spaced sets of latching members, one latching member of each set being mounted on the hood and the other on a part of the automobile fixed in relation to the hood, each set of latching members comprising a hook and a co-operable latching projection, said hooks and projections having interengageable inclined surfaces functioning to hold the hood down and inwardly against the seat and also to centralize the hood longitudinally, one of said latching members of one set being yieldably held in latching position whereby the hood may be automatically latched in position or released and raised upon being lowered and raised, respectively.

5. A fastening device for the hood of an automobile including a latching hook adapted to be secured to a part of the automobile fixed in relation to the hood and a co-operable latching projection constructed of a single piece of sheet metal bent to form an attaching portion adapted to be secured to the hood and also to provide a pair of inwardly extending engaged arms co-operable with the hook.

6. A fastening device for the hood of an automobile having the usual frame and including a mounting bracket constructed of a single piece of sheet metal and provided with an attaching wing adapted to be secured to a part of the automobile above the frame, a latching hook pivotally mounted on its bracket, co-operable means between the hook and bracket for limiting the movement of the hook in one direction, spring means between the hook and bracket for urging the hook to latching position and a latching projection adapted to be secured to the hood and to extend inwardly therefrom and co-operable with said latching hook.

7. A fastening device for the hood of an automobile including a pair of mounting brackets, one provided with means adapted for attachment to the cowl of the automobile and the other provided with means adapted for attachment to the radiator casing, a pair of oppositely disposed latching hooks, one such hook being pivotally mounted on each of said brackets for swinging movement in a plane longitudinally of the hood, spring means biasing the hooks to latching position and latching projections adapted to be secured to the hood and extending inwardly therefrom and co-operable with said hooks.

8. In a fastening device of the character described, a mounting bracket, a latching hook having a shank provided with a U-shaped formation at its lower end, means coacting with the U-shaped formation for mounting the hook for swinging movement, said U-shaped formation coacting with the bracket to limit the movement of the hook in one direction, spring means between the bracket and the hook for urging it in said direction, and a cooperable latching projection engageable with the hook.

9. A fastening device for use with the hood of an automobile including a pair of oppositely disposed latching hooks supported for swinging movement longitudinally of the hood and provided with oppositely inclined longitudinally extending latching shoulders, spring means co-operable with the hooks for urging them to latching position, said hooks having inclined upper edges above said latching shoulders and co-operable latching projections adapted to be secured to the inner side of the hood and extending inwardly and upwardly therefrom, each of said latching projections having an attaching portion and a pair of inwardly converging upper and lower arms engaging each other adjacent their outer ends and co-operable with the inclined surfaces and locking shoulders, respectively, of the hooks.

10. A fastening device of the character described comprising a bracket, a hook having a shank pivoted to the bracket and provided with a double beveled nose, spring means for biasing the hook to latching position and a latching projection engageable with the hook and co-operable with the double beveled nose thereof to provide for automatic latching engagement of the projection and hook when they are brought into latching relation.

11. A fastening device of the character described comprising a bracket, a hook having a shank pivoted to the bracket and formed with a latching shoulder inclining first gradually inwardly from the nose of the hook and then inclining sharply in the direction of the pivot toward its inner end, means for biasing the hook to latching position and a latching projection co-operable with the latching shoulder of the hook.

12. A fastening device of the character described comprising a bracket, a hook pivoted to the bracket, a latching projection co-operable with the hook, offset spring cups secured to the hook and bracket and a spring having its ends received in said cups, the offsetting of the cups tending to prevent buckling of the spring when the hook is swung.

13. A fastening device for the hood of an automobile comprising a latching hook supported for swinging movement and having a bevelled upper edge and a locking shoulder underlying said edge and a co-operable latching projection adapted to be secured to the hood and engageable with the bevelled edge and locking shoulder of the hook, said projection having a portion offset and acting to retain the projection engaged with the bevelled edge of the hook when the parts are being moved into latching relation.

In witness whereof, I hereto affix my signature.

LOUIS G. RANDALL.